United States Patent
Mochizuki et al.

[19]

[11] Patent Number: 6,044,248

[45] Date of Patent: Mar. 28, 2000

[54] SELECTIVE CALL RECEIVER FOR DISPLAYING MESSAGES INCLUDING GRAPHICAL IMAGES

[75] Inventors: Yasuyuki Mochizuki; Takahiro Suzuki, both of Shizuoka, Japan

[73] Assignee: NEC Corporation, Japan

[21] Appl. No.: 08/772,507

[22] Filed: Dec. 24, 1996

[30] Foreign Application Priority Data

Dec. 25, 1995 [JP] Japan .................................. 7-337527
Feb. 26, 1996 [JP] Japan .................................. 8-038190
Feb. 26, 1996 [JP] Japan .................................. 8-038191

[51] Int. Cl.$^7$ ...................................................... H04Q 3/02
[52] U.S. Cl. .................... 455/38.4; 455/566; 340/825.44
[58] Field of Search ................................. 455/412, 38.1, 455/38.4, 186.1, 575, 228, 566; 340/825.44

[56] References Cited

U.S. PATENT DOCUMENTS

| | | | |
|---|---|---|---|
| 4,897,835 | 1/1990 | Gaskill et al. | 340/825.44 |
| 5,452,356 | 9/1995 | Albert | 380/9 |
| 5,537,407 | 7/1996 | Park et al. | 455/38.3 |
| 5,552,779 | 9/1996 | Gaskill et al. | 455/38.4 |
| 5,784,001 | 7/1998 | Deluca et al. | 340/825.44 |

FOREIGN PATENT DOCUMENTS

| | | |
|---|---|---|
| 2-82824 | 3/1990 | Japan . |
| 5-235832 | 9/1993 | Japan . |
| 5235832 | 9/1993 | Japan . |
| 7321938 | 9/1993 | Japan . |
| 7170556 | 7/1995 | Japan . |
| 7226969 | 8/1995 | Japan . |

*Primary Examiner*—Edward F. Urban
*Attorney, Agent, or Firm*—Ostrolenk, Faber, Gerb & Soffen, LLP

[57] ABSTRACT

A selective call receiver includes a code memory storing a plurality of graphic image units and graphic image unit codes, and a plurality of pieces of character data and character data codes. Code information is extracted from a message having a predetermined format. The code information includes a graphic image unit code and a character data code. Based on the code information, a graphic image unit corresponding to the graphic image unit code and a piece of character data corresponding to the character data code are read from the code memory, and then the message with the graphic image unit and the piece of character data is displayed on the display.

17 Claims, 10 Drawing Sheets

FIG.2

CHARACTER CODE MEMORY 106

| COL. / ROW | 1 | 2 | 3 | 4 | 5 | | |
|---|---|---|---|---|---|---|---|
| 1 | A | B | C | D | E | | |
| 2 | F | G | H | I | J | | |
| 3 | K | L | M | N | O | | |
| | | | | | | | |
| | | | | | | | |

FIG.3

FIXED SENTENCE CODE MEMORY 107

| FIXED SENTENCE CODE | MESSAGE DATA |
|---|---|
| 01 | APPOINT TIME |
| 02 | CALL OFFICE |
| 03 | SELL IT |
| 04 | WE NEED HELP |

GRAPHIC IMAGE CODE MEMORY 108

| GRAPHIC IMAGE CODE | IMAGE DATA |
|---|---|
| 01 | ♥ |
| 02 | ☕ |
| 03 | 🏃 |
| 04 | 🖥 |

| GRAPHIC IMAGE CODE | IMAGE DATA |
|---|---|
| 05 | ◐ |
| 06 | ◣ |
| 07 | ◑ |
| 08 | ◤ |

GRAPHIC IMAGE DISPLAYING LOCATION

SCREEN OF LCD

| L1 | L3 |
|---|---|
| L2 | L4 |

FIG.6A
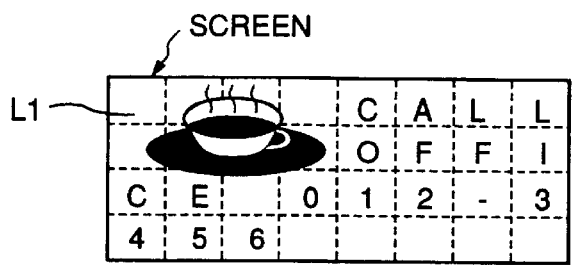
MESSEGE CODE INFORMATION:
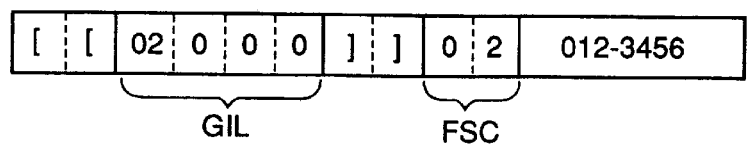
FIG.6B
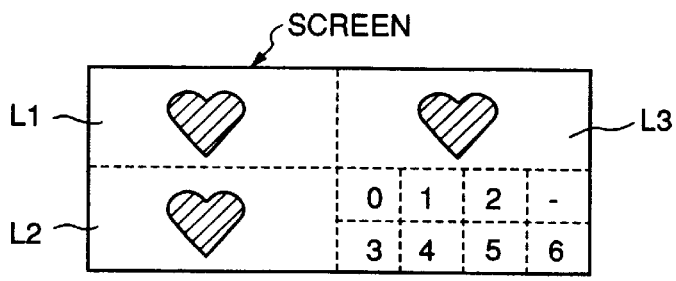
MESSEGE CODE INFORMATION:
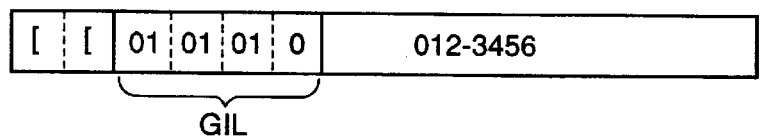
FIG.6C
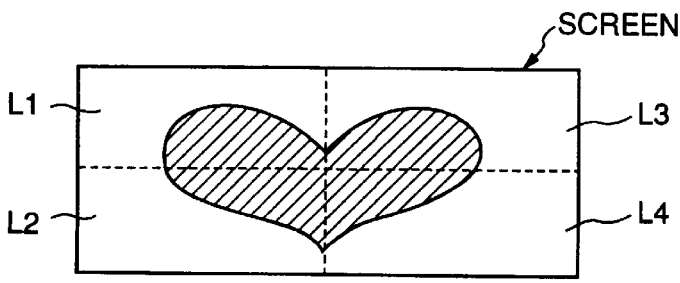
MESSEGE CODE INFORMATION:
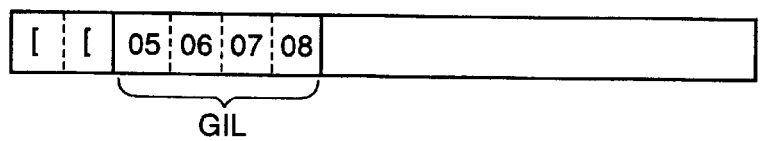

GIC: GRAPHIC IMAGE CODE

GIL: GRAPHIC IMAGE DISPLAYING LOCATION

SW: IMAGE SWITCHING PERIOD

{ NO SWITCHING WHEN SW=0,
PERIOD OF ONE SECOND WHEN SW=1, AND
PERIOD OF TWO SECONDS WHEN SW=2 }

MESSAGE CODE INFORMATION:
[[0210]]02012-3456

MESSAGE CODE INFORMATION:
[[0220]]02012-3456

MESSAGE CODE INFORMATION:
[[0230]]02012-3456

MESSAGE CODE INFORMATION:
[[0240]]02012-3456

SWITCHING IN PERIOD OF ONE SECOND

MESSAGE CODE INFORMATION:
[[0 2 1 1 0 1]] 0 2 0 1 2 - 3 4 5 6

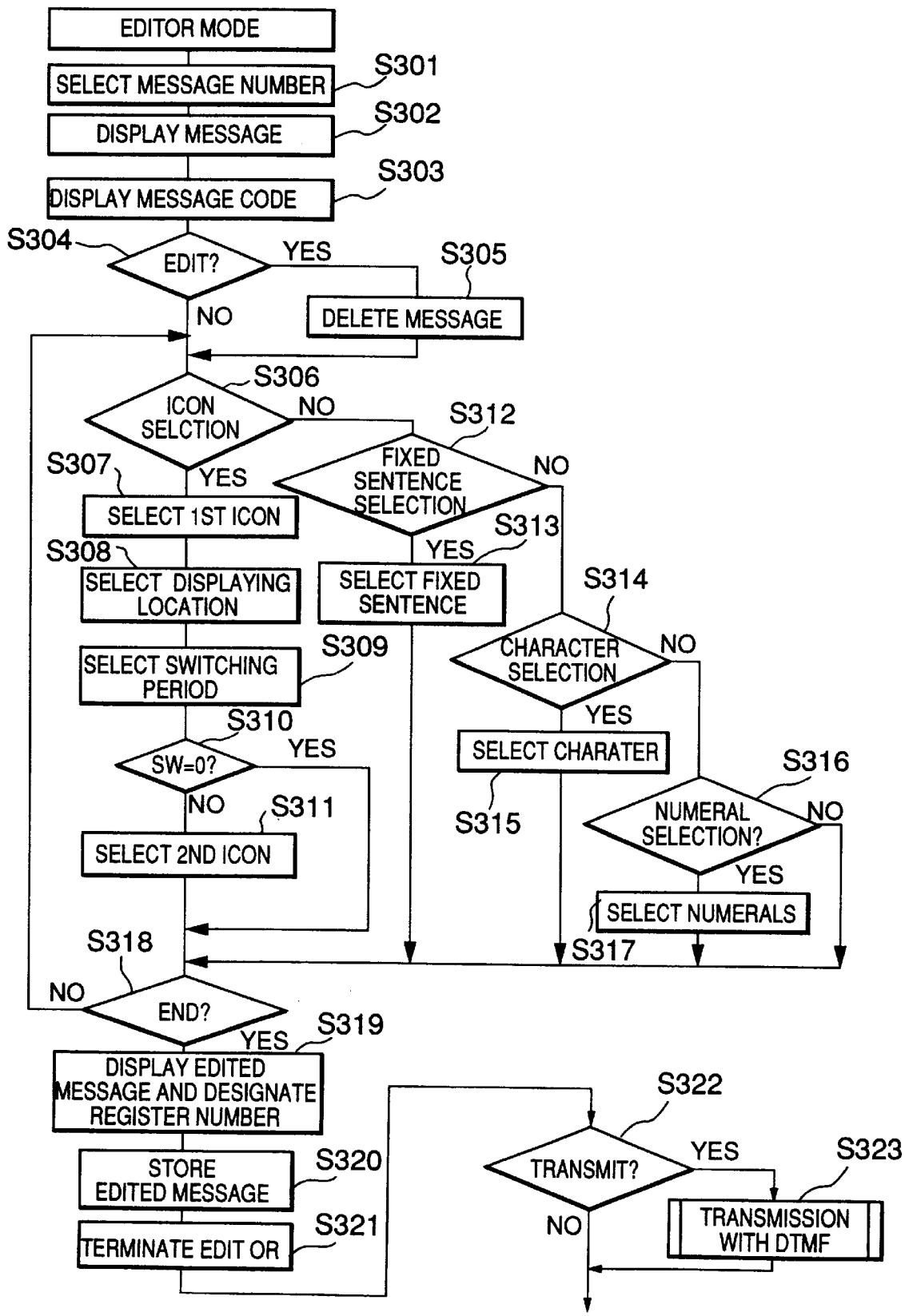

SELECTIVE CALL RECEIVER FOR DISPLAYING MESSAGES INCLUDING GRAPHICAL IMAGES

BACKGROUND OF THE INVENTION

1. Field of the Invention

The present invention relates to a radio selective calling system, and in particular to a selective call receiver having a display for displaying a message on screen.

2. Description of the Related Art

A portable selective call receiver is widely used as a receiving terminal of a radio selective calling system or a paging system. In cases where a call is initiated by using a public telephone switching network, the caller dials a calling number and then transmits an encoded message according to an instruction received from an exchange.

Recently, a paging receiver with such a message transmission function has been proposed (for instance, see Japanese Patent Laid-open Publication No. 2-82824). This kind of receiver is provided with a transmitter and a memory storing a plurality of fixed sentence codes, character codes, and numeral codes. These codes are used by a user to produce a transmission message.

However, the conventional paging receiver cannot edit messages including graphic images but can only edit characters and numerals. It is apparent that graphic images are an important factor in passing information to a person smoothly especially in the case of a paging receiver having a limited display area.

Another paging system which is able to transmit graphic images is disclosed in Japanese Patent Laid-open Publication No. 5-235832. A transmitting side of this system is provided with a memory storing fixed sentence codes and another memory storing image data. By combining fixed sentence codes and image data, a long transmission message can be transmitted.

However, this paging system is intended for use in a large-scale system like a personal computer on the transmitting side. Such a large system cannot be applied to the paging receiver. In addition, since only a single image pattern which is previously registered is transmitted for each calling signal, it is necessary to repeatedly transmit a transmission message in the case of transmitting a plurality of images combined into one. This results remarkably reduced transmission efficiency.

SUMMARY OF THE INVENTION

An object of the present invention is to provide a selective call receiver which is capable of easily analyzing and displaying a message containing graphic images and characters.

Another object of the present invention is to provide a selective call receiver having a transmission function that efficiently transmit a synthetic image which consists of two or more images.

Still another object of the present invention is to provide a selective call receiver having a receiving function that receives and displays a received message containing at least one image and an editing function that easily produces a transmission message containing at least one image.

According to an aspect of the present invention, the selective call receiver is provided with a code memory that stores a plurality of graphic image units and graphic image unit codes, and a plurality of pieces of character data and character data codes. By analyzing a message having a predetermined format, code information is produced which includes a graphic image unit code and a character data code which are included in the message. Based on the code information, a graphic image unit corresponding to the graphic image unit code and a piece of character data corresponding to the character data code are read from the code memory, and then the message with the graphic image unit and the piece of character data is displayed on the display.

Preferably, the code information comprises graphic image information, and character data information where the graphic image information includes the graphic image unit code and display location information which determines a displaying location on the display.

More specifically, a screen of the display is equally divided into a plurality of displaying locations which correspond to predetermined data positions of the message. The display location of the graphic image unit is determined depending on which of the predetermined data positions of the message is selected to store the graphic image unit code. Therefore, by selecting a plurality of predetermined data positions of the message, it is possible to display a single graphic image unit repeatedly at displaying locations corresponding the plurality of predetermined data positions.

Further, in the case of the graphic image units including a set of graphic image units into which a single graphic image is divided and a set of graphic image unit codes corresponding to the set of graphic image units, by selecting a plurality of predetermined data positions of the message to store the set of graphic image unit codes, it is possible to display the plurality of graphic image units combined into the single graphic image on the display.

A screen of the display may be equally divided into a predetermined number of displaying locations having predetermined location codes assigned, and the display location information is set to one of the predetermined location codes. In the case of the graphic image information including a plurality of graphic image unit codes and image switching information, graphic image units corresponding to the plurality of graphic image unit codes are read and the message is displayed with switching between the plurality of graphic image units according to the image switching information.

According to another aspect of the present invention, the selective call receiver is further provided with a radio receiver which receives a radio selective calling signal including a calling number signal and a message signal from a radio base station. The radio selective calling signal causes the selective call receiver to produce the message from the message signal when a received calling number is coincident with an identification number of the selective call receiver. Therefore, when the message is received, the message is analyzed and then, based on the results, the message is displayed with the graphic image unit and the character data as described above.

The selective call receiver is furthermore provided with a editor and a transmitter. The editor provides the capability to edit the message such that the graphic image unit code and the character data code are selected according to the user's instruction through the input means. The transmitter transmits a calling signal comprising a calling number and the message edited by the editor. Preferably, an edited message is stored in a message memory. When a message is edited for transmission, the edited message is read from the message memory and then it is edited again to produce the message for transmission.

BRIEF DESCRIPTION OF THE DRAWINGS

FIG. 2 is a schematic diagram showing an example of the contents of the character code memory as shown in FIG. 1;

FIG. 3 is a schematic diagram showing an example of the content of the fixed sentence code memory as shown in FIG. 1;

FIGS. 6A to 6C are diagrams showing the respective displayed patterns corresponding to examples of a message according to the signal format of FIG. 5;

FIG. 11 is a flow chart showing another example of message editing in the selective call receiver in the selective calling system of FIG. 8.

DETAILED DESCRIPTION OF THE PREFERRED EMBODIMENTS

Figure 1:
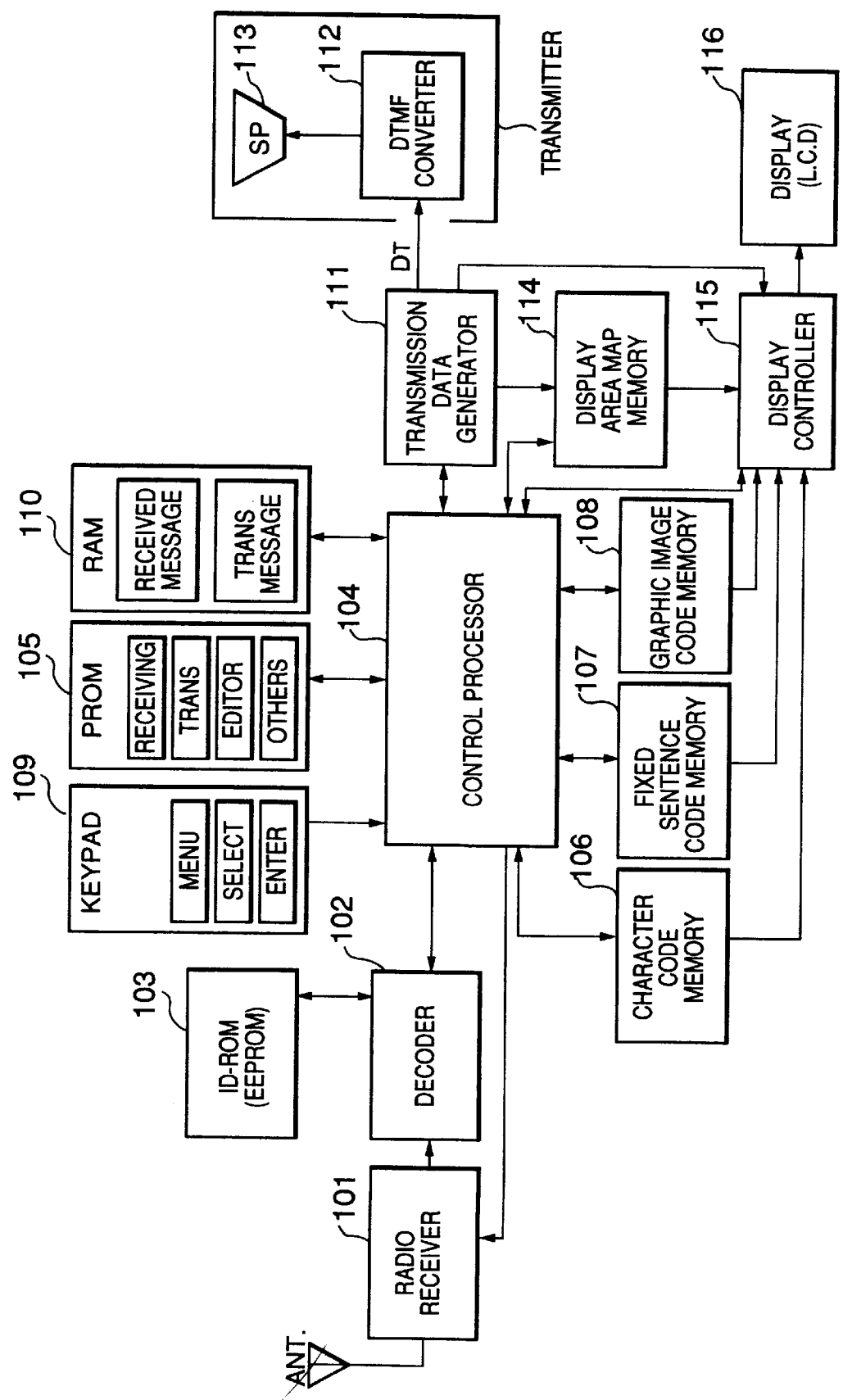
FIG. 1 is a block diagram showing an embodiment of a selective call receiver according to the present invention.

Referring to FIG. 1, a selective call receiver according to an embodiment of the present invention has a transmission function in addition to a reception function. In other words, the selective call receiver is capable of receiving a radio selective calling signal from a radio base control station (not shown) which is connected to a public telephone switching network and is also capable of transmitting a calling message signal through a subscriber telephone line.

A receiving antenna is connected to a radio receiver 101 which receives and demodulates a radio wave into a baseband received calling signal. When receiving the received calling signal from the radio receiver 101, a decoder 102 detects its own identification number from the received calling signal by referring to the identification numbers stored in a memory (ID-ROM) 103 which may be an EEPROM (electrically erasable programmable read-only memory). When the identification number is detected, the decoder 102 outputs the message data continued in the received calling signal to a control processor 104.

The control processor 104 controls the operation of the selective call receiver according to programs stored in a program memory 105 as described later. The program memory 105 stores the programs necessary for message edition, reception, transmission, displaying, and other functions. These operation controls are performed by the control processor 104 referring to a character code memory 106, a fixed sentence code memory 107, and a graphic image code memory 108. In addition, the control processor 104 accepts user instructions from a key pad 109. For instance, the user uses the key pad 109 to instruct the control processor 104 to perform menu selection, code selection, selection determination, stop of informing, and the like. Moreover, the control processor 104 uses a random access memory 110 to store received messages and edited transmission messages.

In this embodiment, the transmission function is implemented with a transmission data generator 111, a DTMF (Dual Tone Multifrequency) converter 112, and a speaker 113. More specifically, when receiving an edited transmission message from the control processor 104, the transmission data generator 111 produces transmission data $D_T$ including a calling number and the edited transmission message and outputs it to the DTMF converter 112 which converts the transmission data $D_T$ into a tone signal suitable for the telephone line in well-known DTMF technology. The tone signal is converted to a sound wave by the speaker 113. In other words, the DTMF converter 112 and the speaker 113 compose a kind of acoustic coupler. The sound wave generated with the speaker 113 is converted into an electric signal with the microphone of a telephone set and then it travels to a destination receiver through the telephone network and the control base station. Since the speaker 113 can be also used to inform the user of an incoming call, another speaker need not be independently provided.

It should be noted that a similar transmission function can be obtained in place of the acoustic coupler with a well-known connector directly connected to the subscriber line. Needless to say, the transmitter is not limited to a specific transmission scheme and a transmission device suitable for being mounted within a selective call receiver can be used.

An edited transmission message contains the data which specifies a graphic image code and its displaying location. The display location map data is stored in a display area map memory 114. Under the control of the control processor 104, a display controller 115 reads expanded code data from the character code memory 106, the fixed sentence code memory 107, and the graphic image code memory 108 according to code information included in the edited transmission message. Based on the expanded code data and the display area map data, the display controller 115 controls a display 116 so that the edited message, including a graphic image, is displayed on screen.

As shown in FIG. 2, an alphanumeric data matrix is stored in the character code memory 106. When a received message or an edited transmission message is displayed on screen, alphanumeric expanded data is read from the character code memory 106 according to character codes included in the received message or the edited transmission message.

As shown in FIG. 3, a plurality of fixed sentence codes and the corresponding fixed sentences are stored in the fixed sentence code memory 107. For instance, message data 'APPOINT TIME' corresponding to code '01' and message data 'CALL OFFICE' corresponding to code '02' are in fixed sentence code memory 107.

Figures 4A, 4B, 4C:
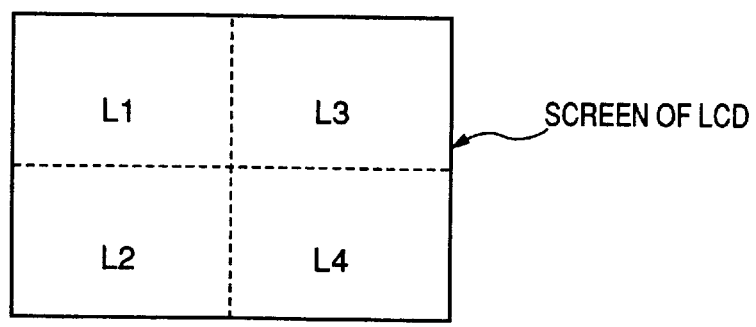
FIG. 4A is a schematic diagram showing an example of the content of the graphic image code memory as shown in FIG. 1.
FIG. 4B is a schematic diagram showing another example of the content of the graphic image code memory as shown in FIG. 1.
FIG. 4C is a schematic diagram showing a displaying area map for graphic images.

As shown in FIG. 4A, a plurality of unit graphic image patterns and the corresponding codes are stored in the graphic image code memory 108. For instances, a heart-shaped pattern corresponding to code '01' and a teacup-shaped pattern corresponding to code '02' are stored in graphic image code memory 108. As for unit graphic image patterns, each is not limited to a special one. However, it is preferable that each pattern is generally interpreted with a specific meaning. For instance, the pattern of code '03' will be generally recognized to the meaning "Better hurry up". As described hereinafter, it is possible to express one meaning by two or more unit patterns being synthesized even if the meaning is not specific to each of the unit patterns.

As shown in FIG. 4B, the graphic image code memory 108 may further store four partial unit patterns corresponding to codes '05'–'08'. In this case, a larger heart-shaped pattern can be displayed on a full screen by these four unit patterns when they are located in the predetermined order at four display area locations L1–L4 as shown in FIG. 4C. Similarly, it is also apparent that a synthetic pattern can be displayed by using an arbitrary number of display area locations. In this embodiment, the display screen of the display 116 is divided into four area locations as shown in FIG. 4C. A unit pattern can be displayed in each display areas L1–L4. As described later, different codes may be assigned to the display areas L1–L4, respectively.

In the selective call receiver described above, a message for reception and transmission has a specific format in accordance with a first embodiment. The selective calling signal used in the radio selective calling system has a predetermined format depending on its transmission scheme. In general, a calling number (identification number or address) is followed by a message signal.

Figure 5:
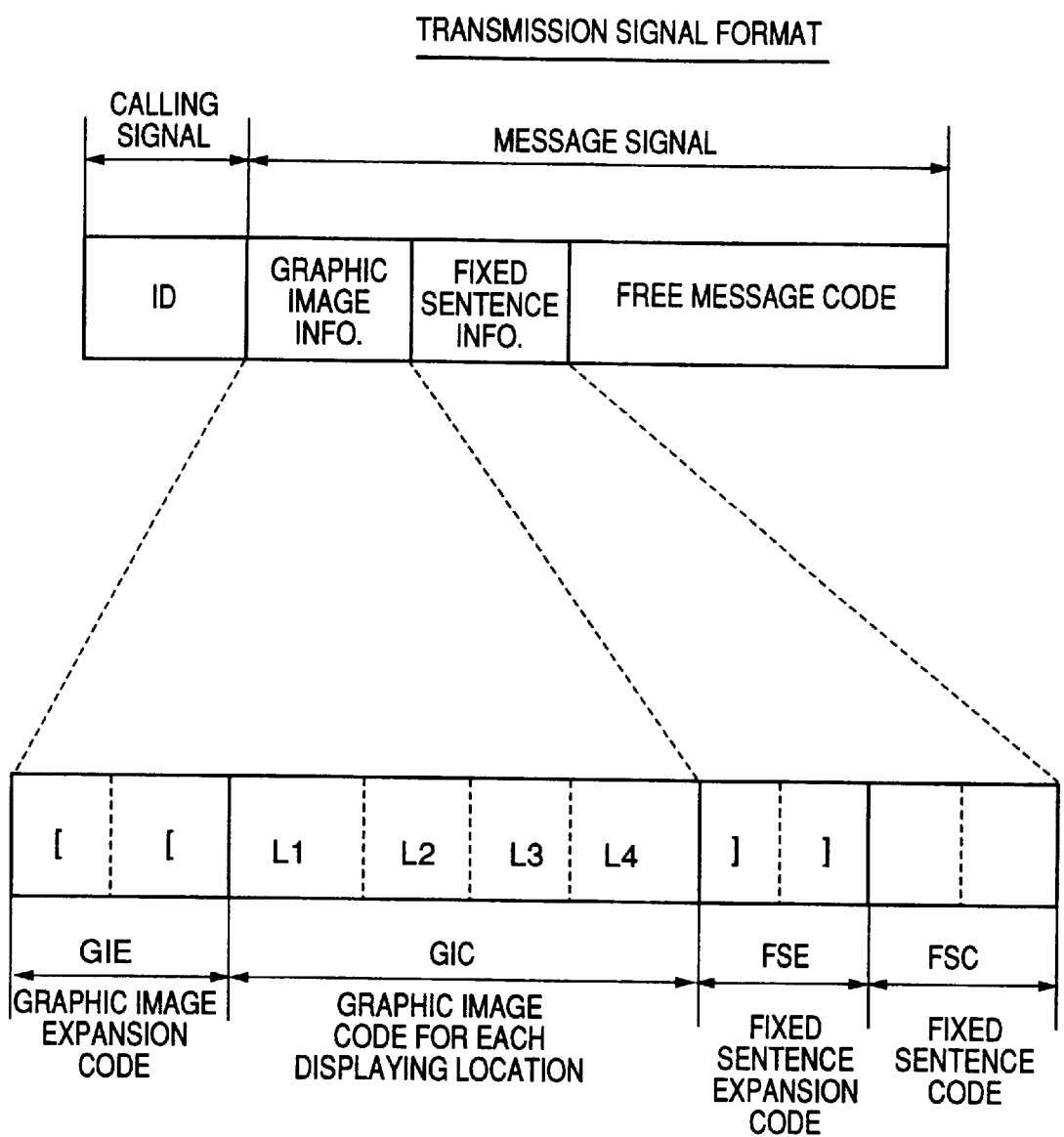
FIG. 5 is a diagram showing a transmission signal format which is employed in an embodiment of a radio selective calling system according to the present invention.

As shown in FIG. 5, the selective calling signal is comprised of a calling signal which includes an identification number and a message signal which includes graphic image information, fixed sentence information, and a free message code. The graphic image information and the fixed sentence information are each identified only by expansion codes. When neither of these expansion codes exist, the message is recognized a free message.

The graphic image information consists of a graphic image expansion code GIE (illustrated in FIG. 5 as '[[') and four graphic image codes GIC corresponding to the graphic image displaying locations L1–L4, respectively. The fixed sentence information consists of a fixed sentence expansion code FSE (illustrated in FIG. 5 as ']]') and a single fixed sentence code FSC. Since a single message signal includes both the graphic image information and the fixed sentence information, the reception and transmission of a mixed graphic-and-text message is permitted, and graphic image patterns and characters can be displayed on screen.

More specifically, when a calling signal including the above message signal is received, the control processor 104 drives the speaker 113 and informs the user of the incoming call. At the same time, the control processor 104 checks for the presence or absence of the graphic image expansion code GIE, and if the GIE is detected, the control processor 104 recognizes the data of a predetermined fixed bit length following the GIE as graphic image codes GIC which sequentially correspond to the displaying area locations L1–L4. Subsequently, the control processor 104 checks for the presence or absence of the fixed sentence expansion code FSE, and if the FSE is detected, the control processor 104 recognizes the data of a predetermined fixed bit length following the FSE as fixed sentence code FSC and the remaining data as a free message (for example, numeric data indicating the digits of a telephone number). After the graphic image code, the displaying location code of the graphic image, the fixed sentence code, and the free message code are obtained by the analysis of the received message, the control processor 104 uses the results to read expanded code data from the character code memory 106, the fixed sentence code memory 107, and the graphic image code memory 108. The expanded code data and the displaying location code are transferred to the display controller 115 which visibly displays the contents of the received message on the display 116.

In the case of transmitting a transmission message, it is necessary to produce the transmission message by editing the graphic image information and the fixed sentence information. The edit of transmission messages will be described in detail later with reference to FIG. 7.

FIGS. 6A to 6C show examples of displayed message patterns on screen. Referring to FIG. 6A, the message code information includes a graphic image code of '02' at the first location of the GIL corresponding to the displaying area location L1 and a no-image code of '0' at the remaining locations, a fixed sentence code FSC of '02', and a free message code of '012-3456'. In response to this specific message code information, the teacup-shaped pattern is displayed at the location L1 and a string of characters 'CALL OFFICE' and '012-3456' is displayed at the remaining area on screen.

Further, referring to FIG. 6B, the message code information used in the Figure includes no fixed sentence code FSC but a graphic image code of '01' at the first three locations of the GIL corresponding to the displaying area locations L1 to L3 and a no-image code of '0' at the fourth location, and a free message code of '012-3456'. In response to this message code information, the heart-shaped pattern is repeatedly displayed at the locations L1 to L3 and a string of characters '012-3456' is displayed at the remaining area on screen.

Furthermore, referring to FIG. 6C, the message code information used in this Figure includes only graphic image codes of '05' to '08' at the four locations of the GIL corresponding to the displaying area locations L1 to L4. In response to this message code information, since the respective partial image patterns are arranged in place, they are combined into a large heart-shaped pattern which is displayed on full screen. Needless to say, such a pattern combination may be also possible in the case of a graphic image pattern other than the heart-shaped pattern.

The procedure by which a transmission message of FIG. 5 is produced will be described hereinafter.

Figure 7:
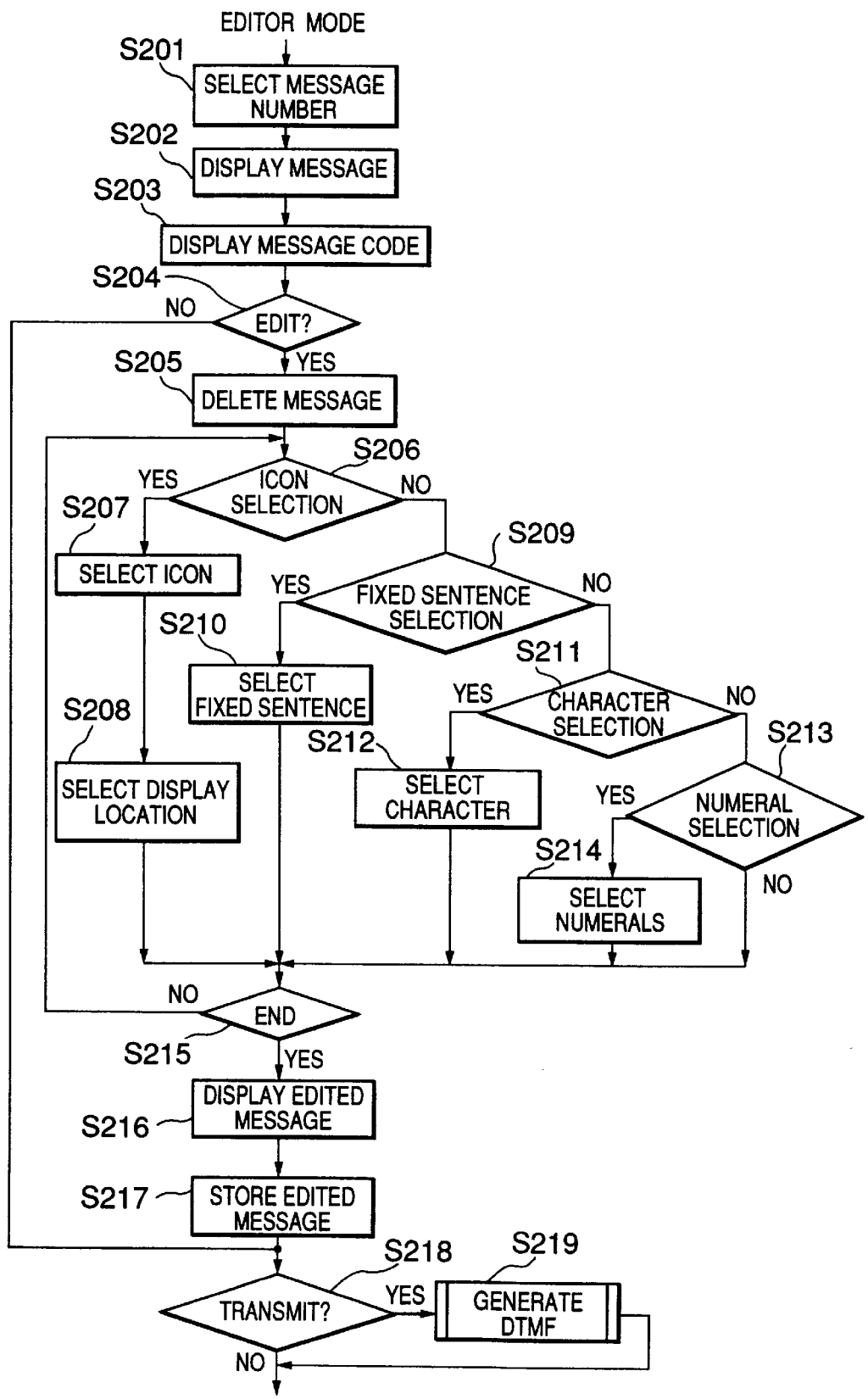
FIG. 7 is a flow chart showing an example of message editing in the selective call receiver in the selective calling system of FIG. 5.

Referring to FIG. 7, in response to the user depressing the menu key of the keypad 109 and selecting the editor mode, the control processor 104 reads the editor program from the program memory 105 and starts it. When a transmission message has been registered in the memory 110, the user selects its message number, which causes the transmission message and its message code to be displayed on the display 116 (steps S201, S202, and S203). When newly editing (YES in step S204), the registered transmission message is deleted (S205) and control goes into a message input mode (steps S206–S215).

First of all, the control processor 104 asks the user whether to input one of a graphic image, a fixed sentence, a character, and a numeral (steps S206, S209, S211, and S213). When a graphic image is to be added to a transmission message (YES in step S206), the user inputs a desired graphic image code (step S207) and further selects (S208) one of the displaying locations L1–L4 in which to display the graphic image. Such a user's operation causes the control processor 104 to store the graphic image expansion code GIE into the head of the transmission message and further to store the selected graphic image code GIC into a location corresponding to the selected displaying location as shown in FIG. 5. Similarly, when a fixed sentence is to be added to a transmission message (YES in step S209), the user inputs a desired fixed sentence code (step S210). Such a user's operation causes the control processor 104 to store the fixed sentence expansion code FSE and the selected fixed sentence code FSC into the two consecutive locations following the GIC field of the transmission message. Furthermore, when character codes are input (YES in step S211 and step S212), the selected character codes are added and, when numerals are input (YES in step S213 and step S214), the selected numerals are further added to produce a free message.

When the edit is ended and the transmission message is completed (YES in step S215), the control processor 104 expands the edited transmission message by using the character code memory 106, the fixed sentence code memory 107, and the graphic image code memory 108. The expanded code data generated based on the edited transmission message is displayed on the display 116 by the display controller 115 using the display area map data (step S216). After that, the edited transmission message is registered together with a register number into the memory 110 (step S217). In the case where the edited transmission message is transmitted by the transmitter (YES in step S218), the edited transmission message is transferred from the memory 110 to the transmission data generator 111 and then the transmission data DT is output to the DTMF converter 112 which generates the corresponding DTMF signal (step S219).

Figure 8:
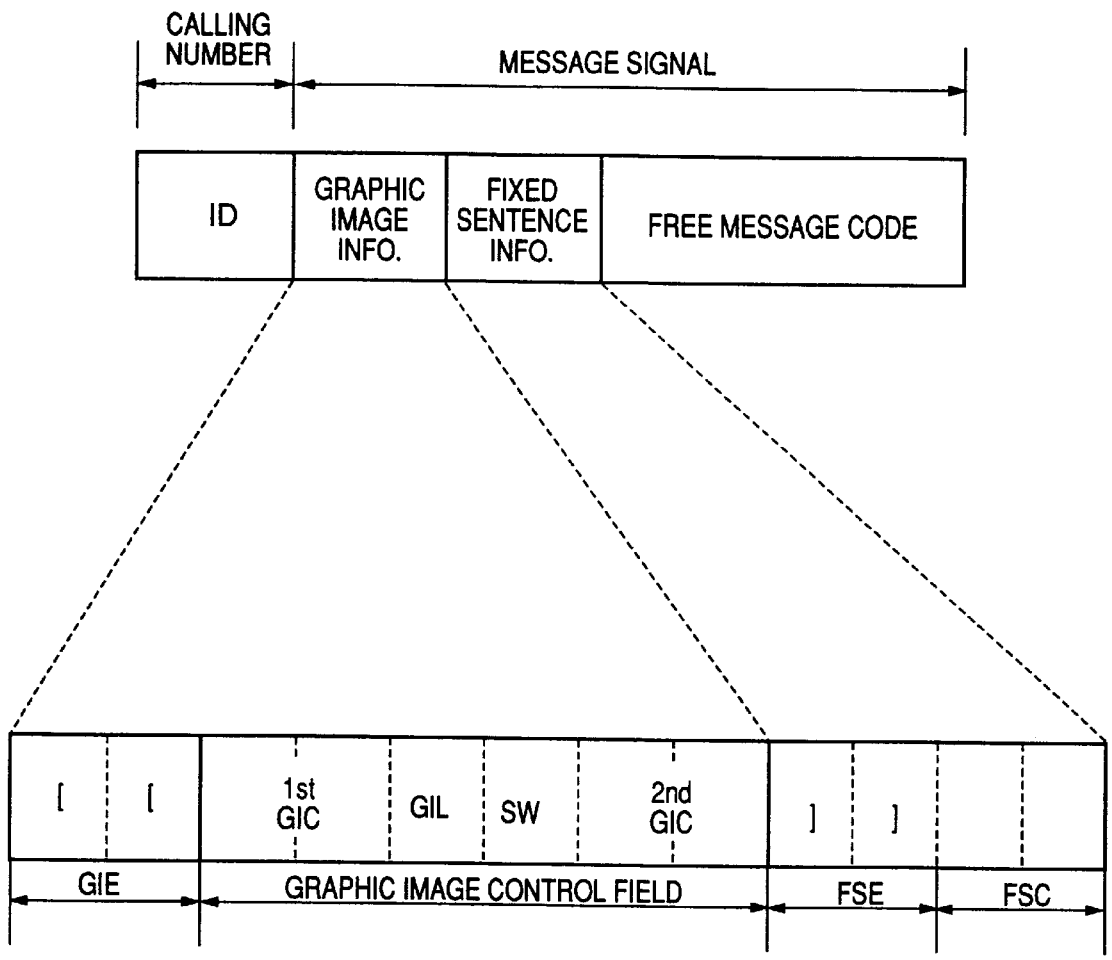
FIG. 8 is a diagram showing a transmission signal format which is employed in another embodiment of a radio selective calling system according to the present invention.

As shown in FIG. 8, the selective calling signal in accordance with a second embodiment is comprised of a calling number which includes identification number and a message signal which includes graphic image information, fixed sentence information, and a free message code. The graphic image information and the fixed sentence information are identified only by their expansion codes. When neither of these expansion codes exist in the selective calling signal, it is recognized as a free message.

The graphic image information consists of a graphic image expansion code GIE (illustrated in FIG. 8 as '[[') and a graphic image control field which further consists of a first graphic image code (1stGIC), a graphic image displaying location GIL, a display switching period SW, and a second graphic image code (2ndGIC). The fixed sentence information consists of a fixed sentence expansion code FSE (depicted in FIG. 8 as ']]') and a single fixed sentence code FSC. Since a single message signal includes the graphic image information and the fixed sentence information, the reception and transmission of a mixed graphic-and-text message is permitted, and graphic image patterns and characters can be displayed on a screen.

In this embodiment, the graphic image displaying location GIL is set to a value selected from four values (1 to 4) which correspond to the displaying locations L1 to L4, respectively. The display switching period SW is set to a value selected from three values (0 to 2). More specifically, in the case where the display switching period SW is set to 0, no switching between the first and the second graphic image patterns is performed and only the first GIC is displayed. When the SW is set to 1, the displayed image switching is performed in a period of one second. That is to say, the first graphic image pattern is displayed for one second and then the second graphic image pattern is displayed for one second. When the SW is set to 2, the displayed image switching is performed in a period of two seconds. Thus, the switching period is designated by the display switching period SW and the displaying location is designated by the graphic image displaying location GIL.

When a calling signal including the above message signal is received, the control processor 104 drive the speaker 113 to inform the user of the incoming call. At the same time, the control processor 104 checks for the presence or absence of the graphic image expansion code GIE. If the GIE is detected, the control processor 104 recognizes the data of a predetermined fixed bit length following the GIE as the first graphic image codes 1stGIC, the graphic image displaying location GIL, the display switching period SW, and the second graphic image code 2ndGIC in sequence. Subsequently, the control processor 104 checks for the presence or absence of the fixed sentence expansion code FSE. If the FSE is detected, the control processor 104 recognizes the data of a predetermined fixed bit length following the FSE as fixed sentence code FSC and the remaining data as a free message. After the graphic image information, the fixed sentence information, and the free message code are obtained by the analysis of the received message, the control processor 104 uses the results to read expanded code data from the character code memory 106, the fixed sentence code memory 107, and the graphic image code memory 108. The expanded code data and the displaying location code are transferred to the display controller 115 which visibly displays the contents of the received message on the display 116.

In the case of transmitting a transmission message, it is necessary to produce the transmission message by editing the graphic image information and the fixed sentence information. The edit of transmission messages will be described in detail later with reference to FIG. 11.

Figure 9A:
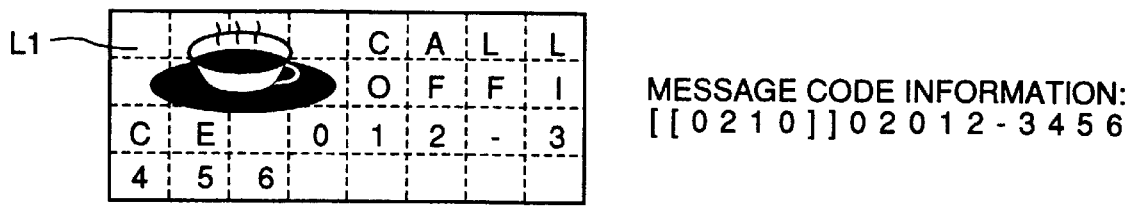
FIGS. 9A to 9D are diagrams showing the respective displayed patterns corresponding to examples of a message according to the signal format of FIG. 8.

FIGS. 9A to 9D show examples of displayed message patterns on screen. Referring to FIG. 9A, the message code information includes a first graphic image code of '02', a graphic image displaying location GIL of 1 corresponding to the displaying area location L1, and a display switching period SW of 0, a fixed sentence code FSC of '02', and a free message code of '012-3456'. In response to this message code pattern, the teacup-shaped pattern is displayed at the location L1 and a string of characters 'CALL OFFICE' and '012-3456' is displayed in the remaining area on the screen.

Figure 9B:
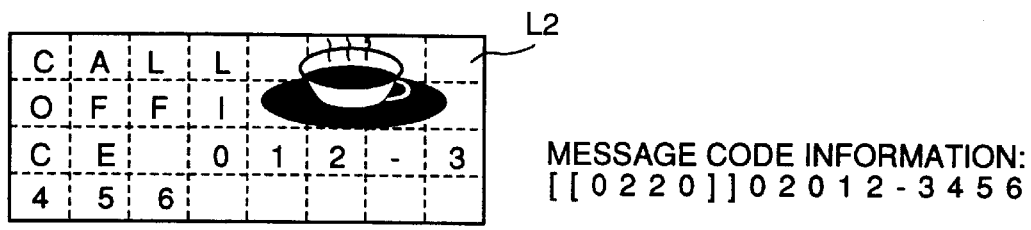
Figure 9C:
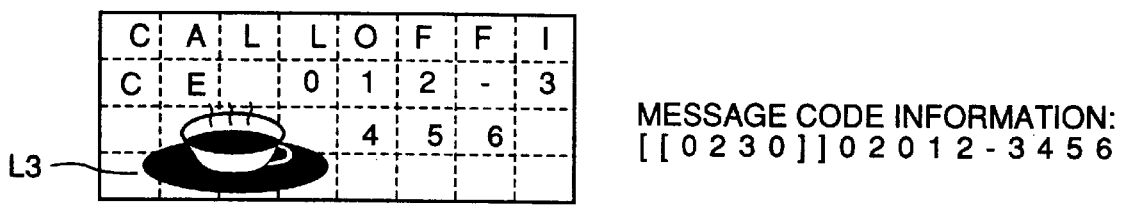
Figure 9D:
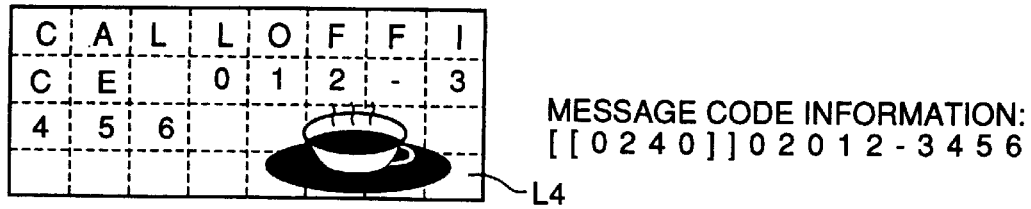

Referring to FIG. 9B, the message code information in this example includes a first graphic image code of '02', a graphic image displaying location GIL of 2 corresponding to the displaying area location L2, and a display switching period SW of 0, a fixed sentence code FSC of '02', and a free message code of '012-3456'. In response to this message code information, the teacup-shaped pattern is displayed at the location L2 and a string of characters 'CALL OFFICE' and '012-3456' is displayed in the remaining area on the screen. Note that the displaying locations L1 to L4 of the second embodiment is somewhat different from that of the first embodiment as shown in FIG. 4. Similarly, as shown in FIGS. 9C and 9D, the displaying location of the teacup-shaped pattern varies with the value of the graphic image displaying location GIL.

Figure 10:
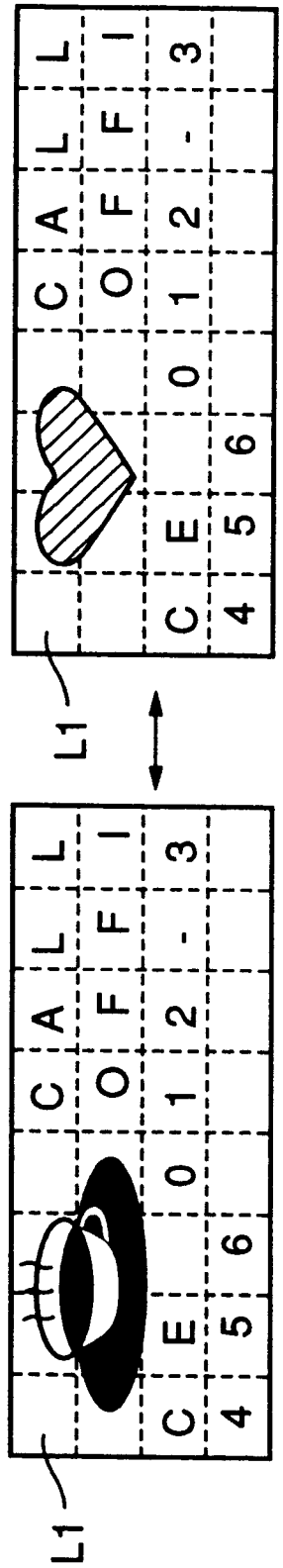
FIGS. 10 is a diagram showing the displayed pattern corresponding to an example of a message containing two graphic images according to the signal format of FIG. 8.

As shown in FIG. 10, the message code information of this example includes a first graphic image code of '02', a graphic image displaying location GIL of 1 corresponding to the displaying area location L1, a display switching period SW of 1, a second graphic image code of '01', a fixed sentence code FSC of '02', and a free message code of '012-3456'. In this case, at the displaying location L1, the teacup-shaped pattern and the heart-shaped pattern are alternately displayed in a period of one second, and a string of characters 'CALL OFFICE' and '012-3456' is displayed at the remaining area on screen. In the case of the display switching period SW being set to 2, the graphic images would be alternately displayed in a period of two seconds.

The procedure by which a transmission message as illustrated in FIG. 8 is produced will be described hereinafter.

Referring to FIG. 11, in response to the user depressing the menu key of the keypad 109 and selecting the editor mode, the control processor 104 reads the editor program from the program memory 105 and starts it. When a transmission message has been registered in the memory 110, the user selects its message number, which causes the transmission message and its message code to be displayed on the display 116 (steps S301, S302, and S303). When newly editing (YES in step S304), the registered transmission message is deleted (S305) and control goes into a message input mode (steps S306–S318). When editing the displayed transmission message (NO in step S304), the control directly goes into the message input mode (steps S306–S318).

First of all, the control processor 104 asks the user whether to input one of a graphic image, a fixed sentence, a character, and a numeral (steps S306, S312, S314, and S316). When a graphic image is added to a transmission message (YES in step S306), the user inputs a desired first graphic image code 1stGIC (step S307), selects one of displaying locations L1–L4 (S308), and further the user inputs a display switching period SW (step S309). If the display switching period SW is set to 1 or 2 (NO in step S310), the control processor 104 prompts the user to input the second graphic image code 2ndGIC (step S311). If the display switching period SW is set to 0 (YES in step S310), the second graphic image code 2ndGIC is not required. Such a user's operation causes the control processor 104 to make the graphic image information as shown in FIG. 8.

Similarly, when a fixed sentence is added to a transmission message (YES in step S312), the user inputs a desired fixed sentence code (step S313). Such a user's operation causes the control processor 104 to store the fixed sentence expansion code FSE and the selected fixed sentence code FSC into the two consecutive locations following the graphic image control field of the transmission message. Furthermore, when character codes are input (YES in step S314 and step S315), the selected character codes are added and, when numerals are input (YES in step S316 and step S317), the selected numerals are further added to produce a free message.

When the editing is ended and the transmission message is completed (YES in step S318), the control processor 104 expands the edited transmission message by using the character code memory 106, the fixed sentence code memory 107, and the graphic image code memory 108. The expanded code data generated based on the edited transmission message is displayed on the display 116 by the display controller 115 using the display area map data, and then the user designates its register number (step S319). After that, the edited transmission message is registered together with the register number into the memory 110 (step S320), and then the editor is terminated (step S312). In the case where the edited transmission message is transmitted by the transmitter (YES in step S322), the edited transmission message is transferred from the memory 110 to the transmission data generator 111 and then the transmission data DT is output to the DTMF converter 112 which generates the corresponding DTMF signal (step S323).

What is claimed is:

1. A selective call receiver comprising:

a display;

input means for inputting a user's instructions;

storage means for storing a plurality of graphic image units and graphic image unit codes, and a plurality of pieces of character data and character data codes;

processing means for processing a message having a predetermined format to produce code information including a first graphic image unit code and a first character data code which are included in the message, wherein the code information comprises graphic image information and character data information, the graphic image information comprising the first graphic image unit code and display location information which determines a displaying location on the display; and control means for reading from the storage means a first graphic image unit corresponding to the first graphic image unit code and a first piece of character data corresponding to the first character data code and for displaying the message with the first graphic image unit and the first piece of character data on the display;

wherein a screen of the display is equally divided into a plurality of displaying locations which correspond to predetermined data positions of the message, the display location of the first graphic image unit being determined depending on which of the predetermined data positions of the message is selected to store the first graphic image unit code.

2. The selective call receiver according to claim 1, wherein a plurality of predetermined data positions of the message are selected so that a single graphic image unit is repeatedly displayed at displaying locations corresponding the plurality of predetermined data positions, respectively.

3. The selective call receiver according to claim 1, wherein:

the plurality of stored graphic image units in the storage means include a set of graphic image units into which a single graphic image is divided and a set of graphic image unit codes corresponding to the set of graphic image units, respectively, and a set of the plurality of predetermined data positions of the message are selected to store the set of graphic image unit codes, so that the set of graphic image units are combined into the single graphic image on the display.

4. A selective call receiver comprising:

a display;

input means for inputting a user's instructions;

storage means for storing a plurality of graphic image units and graphic image unit codes, and a plurality of pieces of character data and character data codes;

processing means for processing a message having a predetermined format to produce code information including a first graphic image unit code and a first character data code which are included in the message, wherein the code information comprises graphic image information and character data information, the graphic image information comprising the first graphic image unit code and display location information which determines a displaying location on the display; and control means for reading from the storage means a first graphic image unit corresponding to the first graphic image unit code and a first piece of character data corresponding to the first character data code and for displaying the message with the first graphic image unit and the first piece of character data on the display;

wherein a screen of the display is equally divided into a predetermined number of displaying locations having predetermined location codes assigned, respectively, the display location information being set to one of the predetermined location codes.

5. The selective call receiver according to claim 4, wherein:

the graphic image information further comprises a second graphic image unit code and image switching information, and the control means further reads from the storage means a second graphic image unit corresponding to the second graphic image unit code and displays the message with switching between the first graphic image unit and the second graphic image unit on the display.

6. A selective call receiver comprising:

a display;

input means for inputting a user's instructions;

storage means for storing a plurality of graphic image units and graphic image unit codes, and a plurality of pieces of character data and character data codes;

processing means for processing a message having a predetermined format to produce code information including graphic image information and character data information which are included in the message, the graphic image information comprising a graphic image expansion code, a first graphic image unit code, and display location information which determines a displaying location on the display, and the character data information comprising a character expansion code and a first character data code; and control means for reading from the storage means a first graphic image unit corresponding to the first graphic image unit code and a first piece of character data corresponding to the first character data code and for displaying the message with the first graphic image unit and the first piece of character data on the display.

7. The selective call receiver according to claim 6, wherein the processing means comprises:

check means for checking whether the graphic image expansion code and the character expansion code are included in the message; and extracting means for extracting the first graphic image unit code from the message when the graphic image expansion code is included in the message and extracting the first character unit code from the message when the character expansion code is included in the message.

8. A selective call receiver comprising:

a display;

input means for inputting a user's instructions;

storage means for storing a plurality of graphic image units and graphic image unit codes, and a plurality of pieces of character data and character data codes;

processing means for processing a message having a predetermined format to produce code information including a first graphic image unit code and a first character data code which are included in the message;

control means for reading from the storage means a first graphic image unit corresponding to the first graphic image unit code and a first piece of character data corresponding to the first character data code and for displaying the message with the first graphic image unit and the first piece of character data on the display;

editing means for editing the message such that the first graphic image unit code and the first character data code are selected according to the user's instruction inputted through the input means; and transmitting means for transmitting a calling signal comprising a calling number and the message edited by the editing means.

9. A selective call receiver comprising:

receiving means for receiving a radio selective calling signal including a calling number signal and a message signal from a radio base station to produce a message from the message signal when a received calling number is coincident with an identification number of the selective call receiver;

a display;

input means for inputting a user's instructions;

storage means for storing a plurality of graphic image units and graphic image unit codes, and a plurality of pieces of character data and character data codes;

processing means for processing a message having a predetermined format to produce code information including a first graphic image unit code and a first character data code which are included in the message;

control means for reading from the storage means a first graphic image unit corresponding to the first graphic image unit code and a first piece of character data corresponding to the first character data code and for displaying the message with the first graphic image unit and the first piece of character data on the display;

editing means for editing the message such that the first graphic image unit code and the first character data code are selected according to the user's instruction inputted through the input means; and transmitting means for transmitting a calling signal comprising a calling number and the message edited by the editing means.

10. A selective call receiver comprising:

a display;

a keypad for inputting a user's instructions;

a memory storing a plurality of stored graphic image units and stored graphic image codes, a plurality of stored predetermined sentences and stored predetermined sentence codes, and plurality of stored characters and stored character codes;

a receiving section which receives a radio selective calling signal including a calling number signal and a message signal from a radio base station said receiving section producing a received message from the message signal when a received calling number is coincident with an identification number of the selective call receiver, the received message comprising received code information including at least one reception graphic image unit code and at least one of a reception predetermined sentence code and a string of reception character codes;

a transmitter transmitting a calling signal to a public network, the calling signal comprising a calling number and a transmission message, the transmission message comprising transmission code information including at least one transmission graphic image unit code and at least one of a transmission predetermined sentence code and a string of transmission character codes;

an editor which edits the transmission message such that the transmission code information is set according to the user's instruction input through the keypad;

a controller which searches the memory for data corresponding to the received code information when the received message is received by the receiving section, said controller further searching the memory for data corresponding to the transmission code information when the transmission message has been edited according to the user's instructions; and display controller which causes the data corresponding to a selected one of the received code information and the transmission code information to be displayed on the display.

11. The selective call receiver according to claim 10, further comprising a message memory for storing an edited transmission message which has been edited by the editing means, wherein the editing means edits the edited transmission message read from the message memory to produce the transmission message.

12. The selective call receiver according to claim 11, wherein:

the received code information comprises reception graphic image information following a reception graphic image expansion code and the reception predetermined sentence code following a reception predetermine sentence expansion code, the transmission code information comprises transmission graphic image information following a transmission graphic image expansion code and the transmission predetermined sentence code following a transmission predetermined sentence expansion code, and the controller searches the memory for a stored graphic image unit corresponding to the reception graphic image information of the received code information when the reception graphic image expansion code is included in the received code information, searches the memory for a stored predetermined sentence corresponding to the reception predetermined sentence code of the received code information when the reception predetermined sentence expansion code is included in the received code information, searches the memory for a stored graphic image unit corresponding to the transmission graphic image information of the transmission code information when the transmission graphic image expansion code is included in the transmission code information, and searches the memory for a stored predetermined sentence corresponding to the transmission predetermined sentence code of the transmission code information when the transmission predetermined sentence expansion code is included in the transmission code information.

13. A method of displaying a message on a display in a selective call receiver comprising the steps of:

storing in a memory a plurality of graphic image units and graphic image unit codes, and a plurality of pieces of character data and character data codes;

processing a message having a predetermined format to produce code information including graphic image information and character data information which are included in the message, the graphic image information comprising a first graphic image unit code and display location information which determines a displaying location on the display, the character data information comprising a first character data code;

reading from the memory a first graphic image unit corresponding to the first graphic image unit code and a first piece of character data corresponding to the first character data code; and displaying on a display the message with the first graphic image unit and the first piece of character data, wherein a screen of the display is equally divided into a plurality of displaying locations which correspond to predetermined data positions of the message, the display location of the first graphic image unit being determined depending on which of the predetermined data positions of the message is selected to store the first graphic image unit code.

14. The method according to claim 13, wherein a plurality of predetermined data positions of the message are selected so that a single graphic image unit is repeatedly displayed at displaying locations corresponding the plurality of predetermined data positions, respectively.

15. The method according to claim 13, wherein:

the plurality of stored graphic image units include a set of graphic image units into which a single graphic image is divided and a set of graphic image unit codes corresponding to the set of graphic image units, respectively, and a set of the plurality of predetermined data positions of the message are selected to store the set of graphic image unit codes, so that the set of graphic image units are combined into the single graphic image on the display.

16. A method of displaying a message on a display in a selective call receiver comprising the steps of:

storing in a memory a plurality of graphic image units and graphic image unit codes, and a plurality of pieces of character data and character data codes;

processing a message having a predetermined format to produce code information including graphic image information and character data information which are included in the message, the graphic image information comprising a first graphic image unit code and display location information which determines a displaying location on the display, the character data information comprising a first character data code;

reading from the memory a first graphic image unit corresponding to the first graphic image unit code and a first piece of character data corresponding to the first character data code; and displaying on a display the message with the first graphic image unit and the first piece of character data, wherein a screen of the display is equally divided into a predetermined number of displaying locations having predetermined location codes assigned, the display location information being set to one of the predetermined location codes.

17. The method according to claim 16, wherein the graphic image information further comprises a second graphic image unit code and image switching information, the method further comprises the steps of:

reading from the memory a second graphic image units corresponding to the second graphic image unit code; and displaying the message with switching between the first and second graphic image units on the display according to the image switching information.

* * * * *